United States Patent
Kawada

(10) Patent No.: US 6,742,274 B2
(45) Date of Patent: Jun. 1, 2004

(54) UNIT-TYPE LINEAR DISPLACEMENT MEASURING APPARATUS, END FIXTURE THEREFOR, AND FIXING METHOD USING THE SAME

(75) Inventor: Hiroaki Kawada, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/255,582

(22) Filed: Sep. 27, 2002

(65) Prior Publication Data

US 2003/0056387 A1 Mar. 27, 2003

(30) Foreign Application Priority Data

Sep. 27, 2001 (JP) ........................................ 2001-295683

(51) Int. Cl.[7] .............................................. A45B 3/08
(52) U.S. Cl. ........................................... 33/702; 33/706
(58) Field of Search ......................... 33/702, 706, 707, 33/708

(56) References Cited

U.S. PATENT DOCUMENTS

| | | | | |
|---|---|---|---|---|
| 4,320,578 A | * | 3/1982 | Ernst | 33/702 |
| 4,479,304 A | * | 10/1984 | Nelle | 33/700 |
| 4,530,157 A | * | 7/1985 | Nelle | 33/700 |
| 4,776,098 A | * | 10/1988 | Nelle | 33/702 |
| 4,912,856 A | * | 4/1990 | Ernst | 33/702 |
| 5,551,163 A | * | 9/1996 | Affa | 33/702 |

FOREIGN PATENT DOCUMENTS

JP          8-14819          1/1996

* cited by examiner

*Primary Examiner*—Diego Gutierrez
*Assistant Examiner*—Amy R Cohen
(74) *Attorney, Agent, or Firm*—Oliff & Berridge, PLC

(57) ABSTRACT

An end fixing block fixed to one end in a length measuring direction of a frame body has a parallel plate spring mechanism capable of absorbing a thermal expansion of the frame body. The frame body has a plate spring mechanism which is provided at the end of the frame body fixed by the end fixing block, the plate spring mechanism being capable of absorbing a deflection of the one end of the frame body in a direction perpendicular to a direction to which the thermal expansion occurs.

7 Claims, 6 Drawing Sheets

UNIT-TYPE LINEAR DISPLACEMENT MEASURING APPARATUS, END FIXTURE THEREFOR, AND FIXING METHOD USING THE SAME

BACKGROUND OF THE INVENTION

1. Field of the Invention

The present invention relates to a unit-type linear displacement measuring apparatus having a detection head integrally formed with a frame body housing a main scale, wherein the detection head detects an amount of movement in a longitudinal direction on the basis of an amount of relative movement of an index scale that moves along the main scale, an end fixture therefor, and a fixing method using the same.

2. Description of the Related Art

In a machine tool, an industrial machine, or the like, an apparatus for detecting a linear displacement of objects to be measured (moving members) that move relatively to each other is used for such as control. As such a linear displacement detecting apparatus, a unit-type linear scale is generally used in which an elongated frame body housing a main scale and a detection head housing a detecting portion such as an index scale capable of relatively moving with respect to the frame body are formed integrally.

In the unit-type linear scale, the main scale is generally incorporated in the frame body made of aluminum. The frame body 10 is directly fixed mainly to a stage-sliding portion of the machine tool, the industrial machine, or the like, with screws 12 at a plurality of positions, as shown in FIG. 6 (this type is referred to as a multi-position fixed type). Alternatively, the frame body 10 is fixed to the stage-sliding portion with the screws 12 mainly at both ends thereof via fixing blocks 14 for fixation, as shown in FIG. 7 (this type is referred to as a double-end fixed type).

However, the frame body 10 is made of aluminum, whereas a mating member to which the frame body is fixed is mainly made of iron, so that the following problem occurs due to the change in an ambient temperature.

Namely, as a generality, a coefficient of linear expansion of iron, of which the mating member is made, is $11 \times 10^{-6}$, whereas a coefficient of linear expansion of aluminum, of which the frame body 10 is made, is $23 \times 10^{-6}$ In the state in which aluminum is fixed to iron, the elongation of aluminum is restricted due to the difference in the coefficient of linear expansion, so that a thermal stress occurs. There is a possibility that deflection and torsion occur in the frame body owing to the thermal stress, and accuracy deteriorates as the main scale in the frame body conforms thereto.

In particular, with the double-end fixed type shown in FIG. 7, the structure is such that deflection or torsion is likely to occur in the frame body 10, so that the aforementioned tendency occurs noticeably.

FIG. 8 shows a fixing mechanism of the double-end fixed type shown in FIG. 7 and an example of the behavior the deflection of the frame body in the case where the ambient temperature has arisen. In FIG. 8, the frame body 10 and the fixing blocks 14 are completely joined with screws 16, and the fixing blocks 14 are fixed to a mating surface (iron) 8 with the screws 12 (see FIG. 7).

When the ambient temperature rises in this state, the frame body 10 tends to be elongated in the left-and-right direction in the drawing (this direction is set as a Z direction), and the amount of its elongation is greater than that of the mating surface 8. At this time, the frame body 10 is elongated relatively easily at the position in an upward direction of the drawing (this direction is set as a +Y direction) in the cross section of the frame body 10. However, the elongation of the frame body 10 in the downward direction of the drawing (this direction is set as a -Y direction) is restricted by the fixing blocks 14, and a thermal stress occurs. Furthermore, since the thermal stress is not a force uniformly distributed in the Y direction of the cross section, this thermal stress is converted into bending moment with respect to the cross section, so that the frame body 10 is curved in the +Y direction. When the ambient temperature has conversely dropped, the frame body 10 is curved in the -Y direction for the same reason.

When the frame body 10 is thus curved, the main scale inside it is also curved, resulting in the deterioration of accuracy. When the thermal stress exceeds the fastening forte with which the frame body 10 and the fixing blocks 14 are fastened, an offset in the joint occurs, so that the relative positional relationship with the mating member 8 changes. This constituted a factor of uncertainty of the origin, and caused the problem that the reproducibility of measured values with respect to the temperature deteriorates.

As a mechanism for absorbing such elongation of the frame body, JP-A-8-14819 discloses a technique in which an end fixture 18, such as the one shown in FIG. 9, is provided at each end. In this end fixture 18, important dimensions for determining the rigidity in the Z direction are t and L. It is necessary to make the dimension of L small in compliance with the demand in recent years for the compact size, and in order to reduce the occurrence of the thermal stress in that state, it is also necessary to make t small. In this case, it is impossible to obtain sufficient rigidity capable of withstanding external forces such as vibrations.

SUMMARY OF THE INVENTION

The invention has been devised to overcome the above-described conventional problems. It is an object to provide a unit-type linear displacement measuring apparatus capable of reducing an occurrence of a thermal stress by positively absorbing an elongation of a frame body due to a change in the ambient temperature while ensuring rigidity, an end fixture therefor, and a fixing method using the same.

To attain the above object, in accordance with the present invention, there is provided a unit-type linear displacement measuring apparatus comprising: a frame body extending in a length measuring direction and housing a main scale; and a first end fixture fixed to one end in the length measuring direction of the frame body and having a parallel plate spring mechanism capable of absorbing a thermal expansion of the frame body, wherein the frame body has a plate spring mechanism which is provided at the one end of the frame body fixed by the first end fixture and which is capable of absorbing a deflection of the one end of the frame body in a direction perpendicular to a direction to which the thermal expansion occurs.

The above-described unit-type linear displacement measuring apparatus preferably further comprises: a second end fixture fixed to another end in the length measuring direction of the frame body and having a parallel plate spring mechanism capable of absorbing the thermal expansion of the frame body.

In addition, the above-described unit-type linear displacement measuring apparatus preferably further comprises: an intermediate-portion fixing block fixed to a substantially central portion in the length measuring direction of the frame body and having rigidity higher than that of the first end fixture.

In addition, to attain the above object, there is provided an end fixture for a unit-type linear displacement measuring apparatus for being fixed to one end in a length measuring direction of a frame body which houses a main scale and which extends in the length measuring direction, so as to fix the frame body to an object to be measured, comprising: a parallel plate spring mechanism capable of absorbing the thermal expansion of the frame body.

Furthermore, to attain the above object, there is provided a method of fixing a unit-type linear displacement measuring apparatus comprising the step of: fixing an object to be measured to a frame body which extends in a length measuring direction and which houses a main scale with a first end fixture fixed to one end in the length measuring direction of the frame body and having a parallel plate spring mechanism capable of absorbing the thermal expansion of the frame body.

The above-described method of fixing a unit-type linear displacement measuring apparatus preferably further comprises the step of: fixing the object to be measured to the frame body with a second end fixture fixed to another end in the length measuring direction of the frame body and having a parallel plate spring mechanism capable of absorbing the thermal expansion of the frame body.

The above-described method of fixing a unit-type linear displacement measuring apparatus preferably further comprises the step of: fixing the object to be measured to the frame body with an intermediate-portion fixing block fixed to a substantially central portion in the length measuring direction of the frame body and having rigidity higher than that of the first end fixture.

DETAILED DESCRIPTION OF THE INVENTION

Referring now to the accompanying drawings, a description will be given of an embodiment of the invention.

Figure 1:
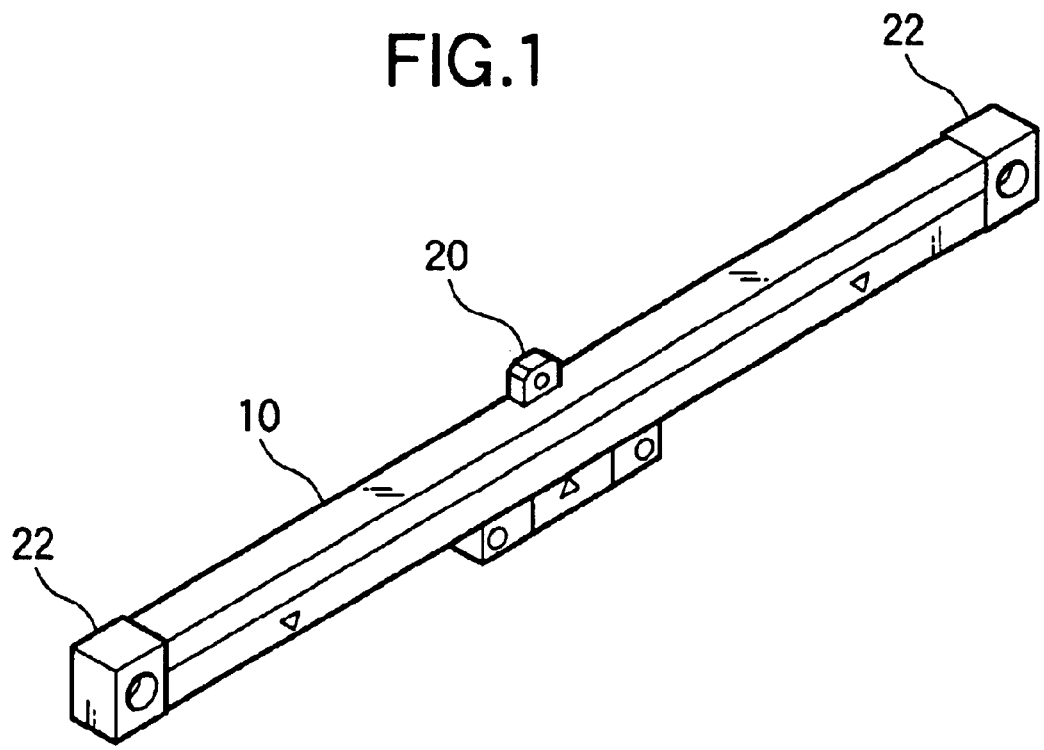
FIG. 1 is a perspective view illustrating a fixing method in accordance with an embodiment of the invention.
Figure 2:
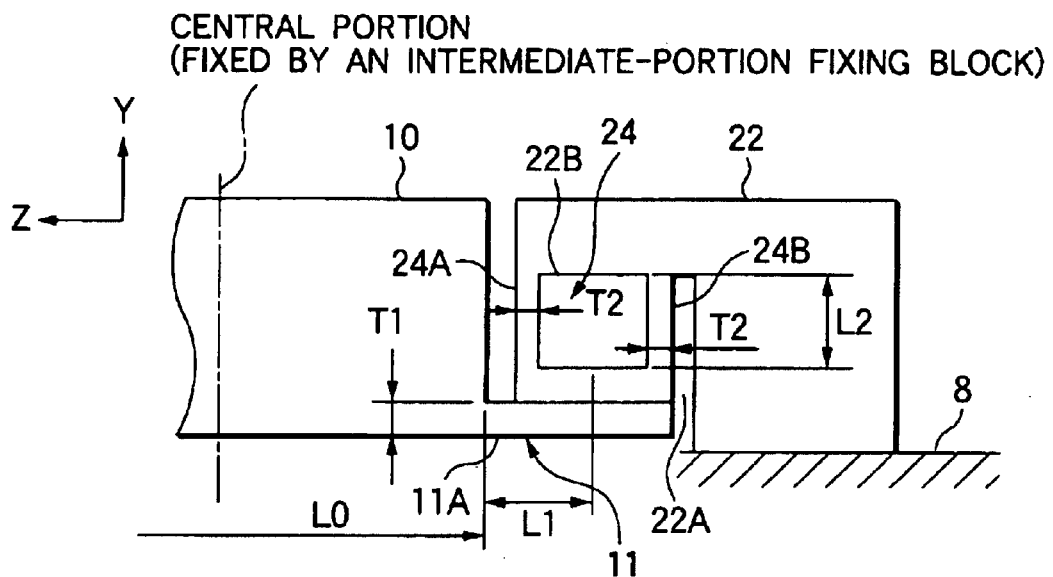
FIG. 2 is an enlarged front elevational view illustrating the arrangement of essential portions in accordance with the embodiment.

As shown in FIG. 1, a frame body 10 has its central portion fixed to a mating surface 8 with an intermediate-potion fixing block 20 having high rigidity, and its both ends in a length measuring direction fixed to the mating surface 8 with a pair of end fixing blocks 22. As shown in detail in FIG. 2, each of the end fixing blocks 22 has a parallel plate spring mechanism 24 capable of absorbing a thermal expansion of the frame body 10 in a Z direction. At an end of the frame body 10 where the end fixing block 22 is fixed, the frame body 10 has a plate spring mechanism 11 capable of absorbing a deflection of an end of the frame body in the Y direction perpendicular to the Z direction to which the thermal expansion occurs. Here, it is assumed that a length of the frame body 10 in the length measuring direction (Z direction) is L0.

The parallel plate spring mechanism 24 of the end fixing block 22 is formed by forming two plate springs 24A and 24B extending vertically by providing a notch 22A and a cavity 22B in the end fixing block 22. Here, it is assumed that a width of each of the plate springs 24A and 24B in the length measuring direction (Z direction) is T2. It is also assumed that a length of the cavity 22B in a direction (Y direction) perpendicular to the length measuring direction (i.e., the length of each of the plate springs 24A and 24B in the direction perpendicular to the length measuring direction) is L2.

The plate spring mechanism 11 of the frame body 10 is constructed by forming a plate spring 11A extending in the left-and-right direction (Z direction) by making short the height of the end of the frame body 10 in the direction perpendicular to the length measuring direction. Here, it is assumed that a width of the plate spring 11A in the direction (Y direction) perpendicular to the length measuring direction is T1. It is also assumed that a distance in the length measuring direction between the end of the frame body 10 and a center in the length measuring direction of the cavity 22B of the end fixing block 22 fixed to that end is L1.

As the intermediate-portion fixing block 20, one having overwhelmingly higher rigidity than that of the parallel plate spring mechanism 24 of the end fixing block 22 or that of the plate spring mechanism 11 of the frame body 10 is used.

The end fixing blocks 22 are fixed to the both ends of the frame body 10 with screws, and the intermediate-portion fixing block 20 is fixed to the center of the frame body 10 with a screw. The frame body 10 is fixed by fixing the three blocks 20 and 22 to the mating surface (not shown), as shown in FIG. 1.

Figure 3:
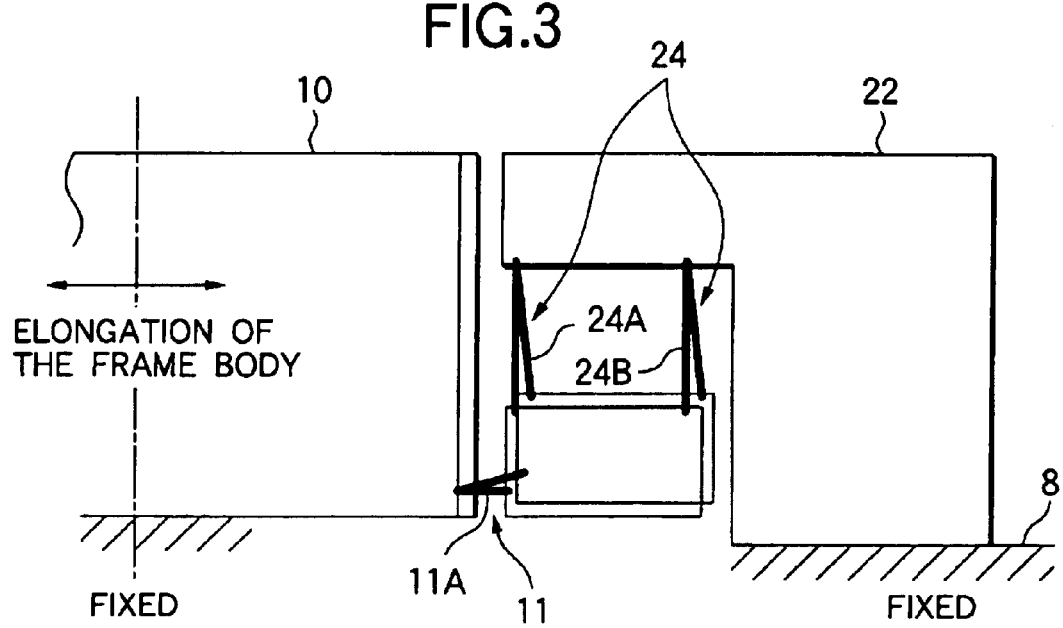
FIG. 3 is an enlarged front elevational view illustrating the operation in accordance with the embodiment.

Hereafter, a description will be given of the operation of this embodiment with reference to FIG. 3.

For example, in a case where the ambient temperature has arisen, the following mechanical behavior occurs. Namely, since the rigidity is overwhelmingly high at the central portion as compared to both ends, the frame body 10 extends uniformly to the left and the right with respect to the center. Accordingly, the origin of elongation of the frame body 10 is set, the stability of the origin with respect to the temperature change improves, and the reproducibility of behavior improves. This is also valid in a case where the relative rigidity is different between the left and right ends due to such as variations in the spring constant of the left and right plate spring mechanisms 11 and 24.

In addition, since the elongation of the frame body 10 is absorbed by the deflection of the plate springs 24A and 24B of the parallel plate spring mechanisms 24 disposed in the respective end fixing blocks 22, it is possible to reduce the occurrence of thermal stress. Since the parallel plate spring mechanism 24 of the end fixing block 22 is a parallel plate spring, when the elongation of the frame body 10 occurs, the displacement also occurs in a direction (upward direction in FIG. 3) other than the length measuring direction. However, since that displacement is absorbed by the deflection of the plate springs 11A of the plate spring mechanisms 11 at both ends of the frame body 10, deflection with the center of the frame body 10 as the origin does not occur. Accordingly, the deflection and occurrence of a strain of the frame body due to the temperature change are reduced, and the deterioration of accuracy and the offsetting of the frame body due to the temperature change are reduced, thereby improving the stability of the origin.

In addition, since the plate springs 24A and 24B of the end fixing block 22 have the structure of a parallel plate spring, it is possible to minimize a decline in the rigidity with respect to directions other than the length measuring direction. Accordingly, after characteristics with respect to external forces such as the vibration resistance characteristic are maintained, it is further possible to improve the temperature characteristic.

It should be noted that the position where the intermediate-portion fixing block 20 is disposed is not limited to the center of the frame body 10, and may be set at an arbitrary position, and its position can be set to the origin of elongation of the frame body 10.

EXAMPLE

Iron was used as the material of the mating member, while aluminum was used as the material of the end fixing blocks 22 of the frame body 10 so as to absorb the elongation of the frame body 10 having an overall length L0=530 mm and reduce its deflection when the ambient temperature changed from 20° C. to 40° C. The respective dimensions in FIG. 2 were set such that L1=4.5 mm, T1=2 mm, L2=13 mm, T2=1.2 mm.

Figure 4:
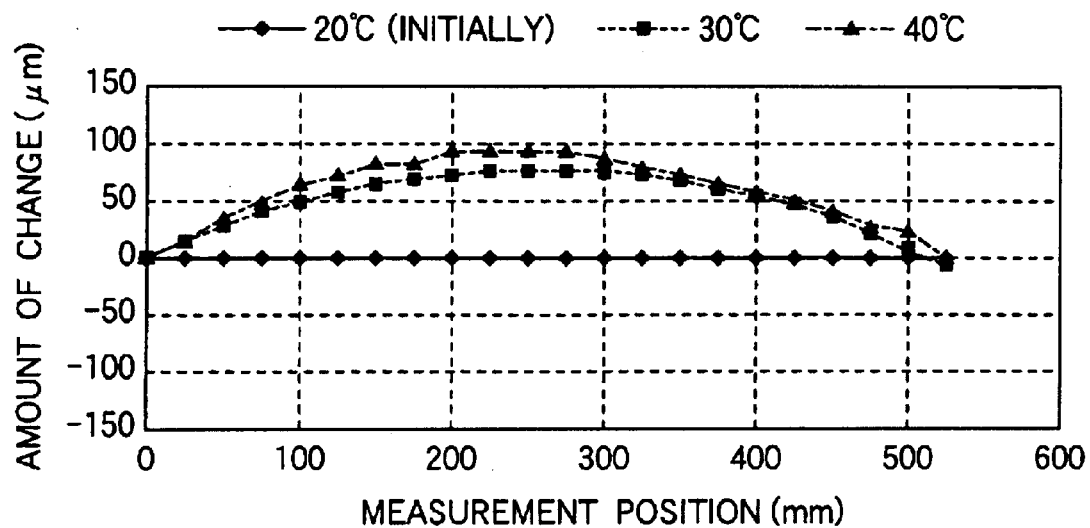
FIG. 4 is a diagram illustrating examples of change in the deflection of a frame body when the ambient temperature changed in a case where a conventional fixing mechanism is used.
Figure 5:
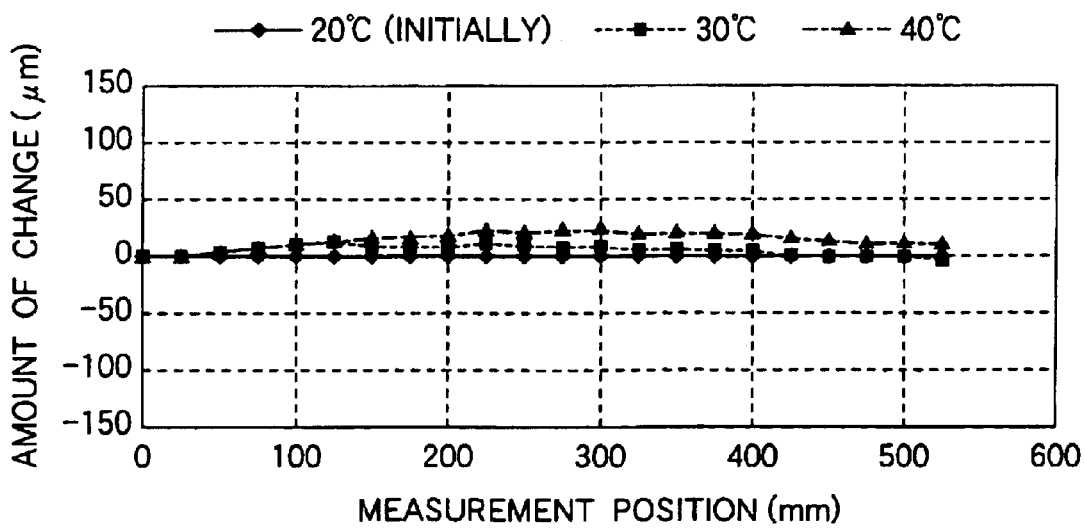
FIG. 5 is a diagram illustrating examples of change in the deflection of the frame body when the ambient temperature changed in a case where the embodiment of the invention is used.
Figure 6:
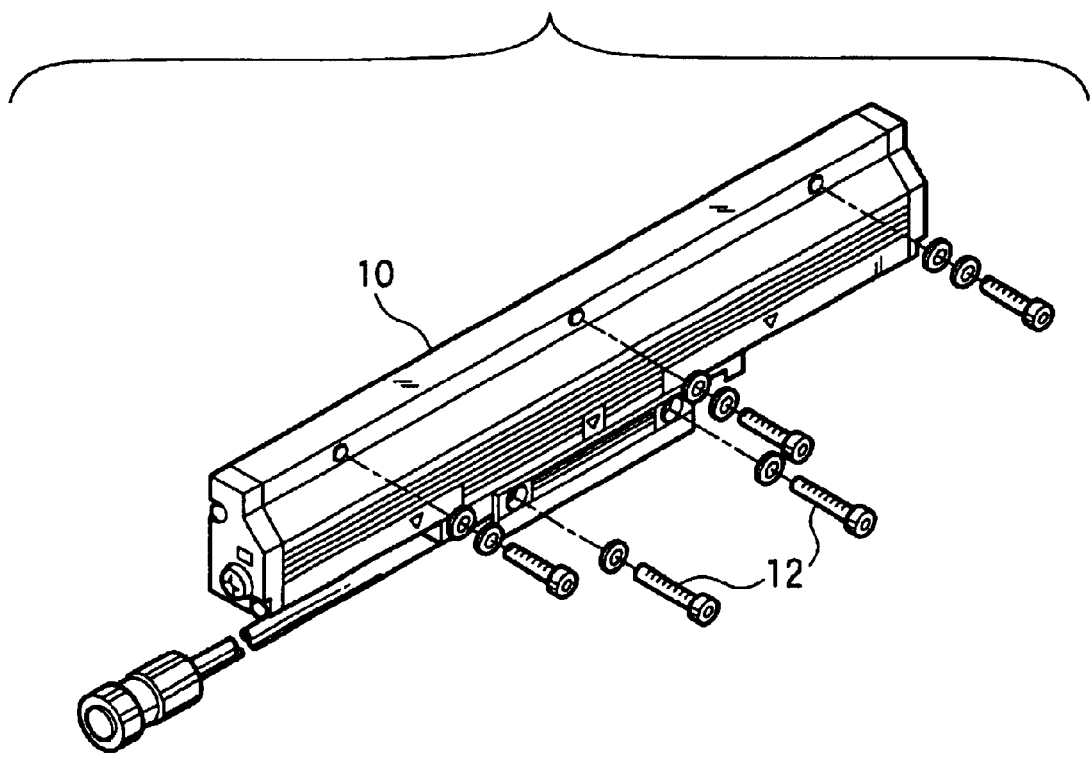
FIG. 6 is a perspective view illustrating a multi-position fixed type which is one example of a conventional method of fixing a unit-type linear scale.
Figure 7:
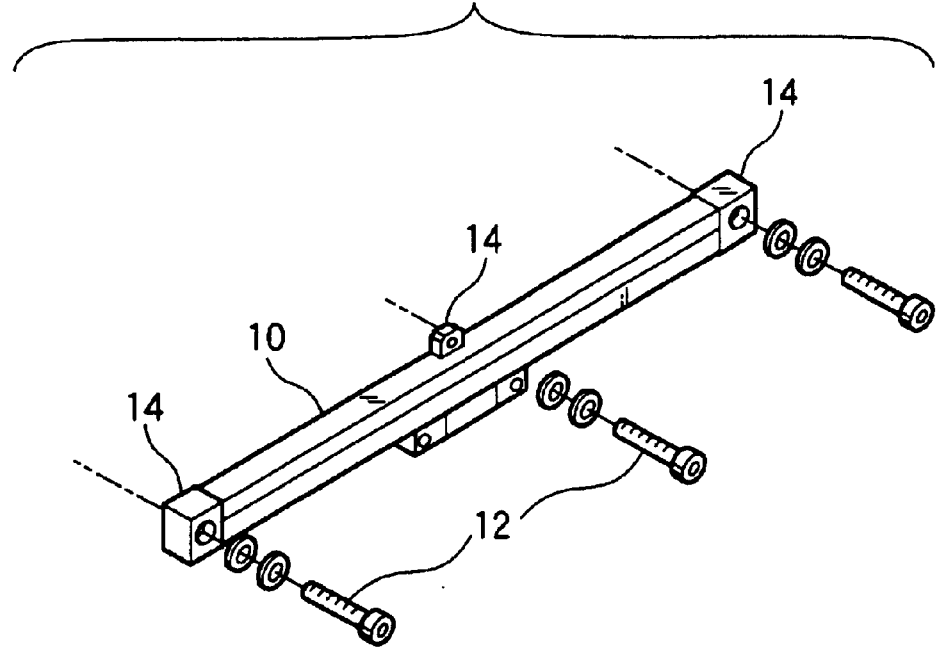
FIG. 7 is a perspective view illustrating a double-end fixed type which is another example of the conventional method of fixing a unit-type linear scale.
Figure 8:
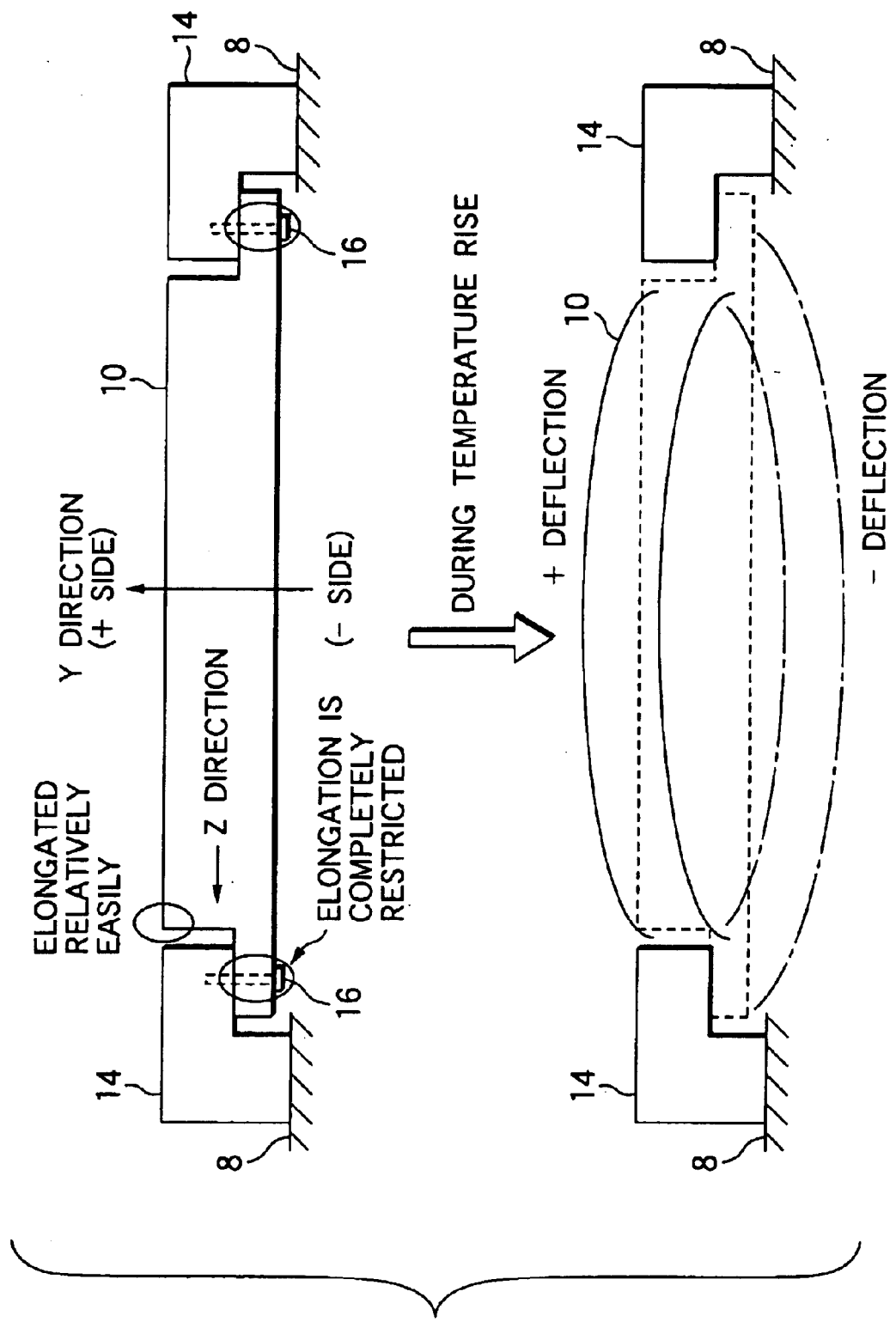
FIG. 8 is a front elevational view explaining a conventional problem.
Figure 9:
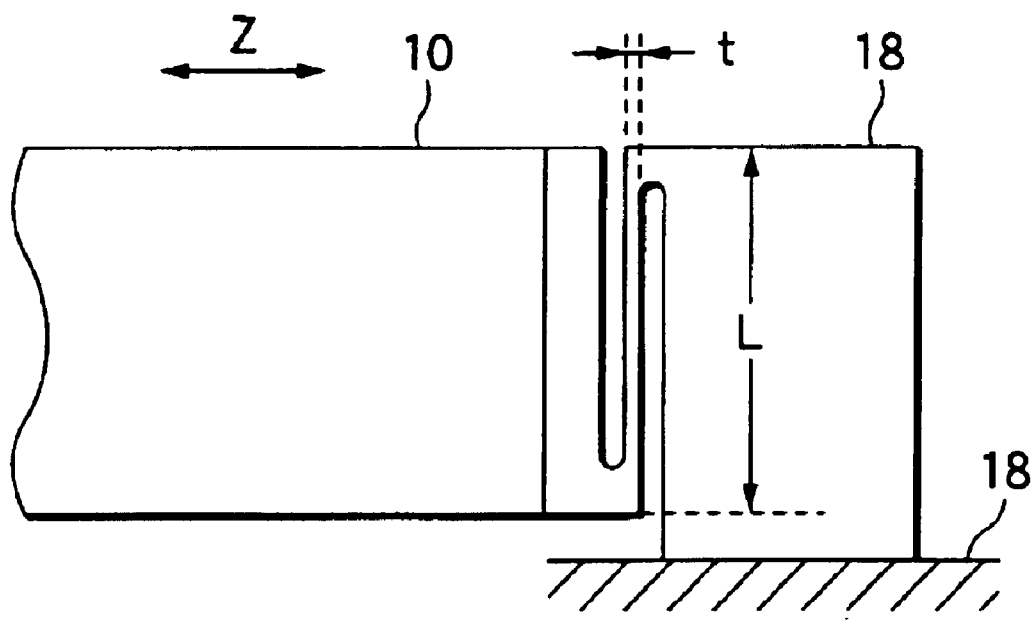
FIG. 9 is a front elevational view illustrating an end fixture proposed in JP-A-8-14819.

FIGS. 4 and 5 show the results of investigation of the change of the deflection of the frame body 10 when the ambient temperature was changed from 20° C. to 30° C. and further to 40° C. in a state in which the apparatus was fixed to the mating surface 8 of the mating member made of iron. In FIG. 4 in which the conventional fixing mechanism was used, the deflection in the + direction in FIG. 8 occurred by 80 to 90 μm due to the rise in the ambient temperature. In contrast, in FIG. 5 in which the embodiment of the invention was used, the change of deflection was in the neighborhood of 10 to 20 μm, and it was confirmed that an improvement was made down to ¼ of the conventional level.

Although a specific description has been given of the invention, the invention is not limited to the above-described embodiment, and various modifications are possible within the range that does not depart from its gist.

For example, the material of the frame body and the fixing block is not limited to aluminum. In addition, instead of fixing the intermediate portion by the intermediate-portion fixing block having high rigidity and fixing both ends by the end fixing blocks in accordance with the invention, one end may be fixed by a fixing block having high rigidity and the other end may be fixed by the end fixing block in accordance with the invention.

In accordance with the invention, it is possible to reduce the occurrence of the deflection of or a strain in the frame body due to a change in the ambient temperature, and reduce offset in the relative positional relationship with a mating surface. Accordingly, outstanding advantages are offered in that it is possible to reduce the deterioration of accuracy due to the change in the ambient temperature and improve reliability concerning the mechanical behavior.

What is claimed is:

1. A unit-type linear displacement measuring apparatus comprising:

a frame body extending in a length measuring direction and housing a main scale; and a first end fixture fixed to one end in the length measuring direction of said frame body and having a parallel plate spring mechanism which absorbs a thermal expansion of said frame body, wherein said frame body has a plate spring mechanism 1 which is provided at said one end of said frame body, and which absorbs a deflection of said one end of said frame body in a direction perpendicular to a direction to which the thermal expansion occurs, and wherein the parallel plate spring mechanism and the plate spring mechanism are coupled to plates.

2. The unit-type linear displacement measuring apparatus according to claim 1, further comprising:

a second end fixture fixed to another end in the length measuring direction of said frame body and having a parallel plate spring mechanism which absorbs the thermal expansion of said frame body.

3. The unit-type linear displacement measuring apparatus according to claim 1, further comprising:

an intermediate-portion fixing block fixed to a substantially central portion in the length measuring direction of said frame body and having rigidity higher than that of said first end fixture.

4. An end fixture for a unit-type linear displacement measuring apparatus for being fixed to one end in a length measuring direction of a frame body which houses a main scale and which extends in the length measuring direction, so as to fix said frame body to an object to be measured, said end fixture comprising:

a parallel plate spring mechanism which absorbs a thermal expansion of said frame body, wherein said frame body is coupled to said end fixture by the parallel plate spring mechanism and a plate spring mechanism, and wherein the parallel plate spring mechanism and the plate spring mechanism are coupled to plates.

5. A method of fixing a unit-type linear displacement measuring apparatus comprising the step of:

fixing an object to be measured to a frame body which extends in a length measuring direction and which houses a main scale with a first end fixture fixed to one end in the length measuring direction of said frame body and the first end fixture having a parallel plate spring mechanism which absorbs a thermal expansion of said frame body.

wherein said frame body is coupled to said first end fixture by the parallel plate spring mechanism and a plate spring mechanism, and wherein the parallel plate spring mechanism and the plate spring mechanism are coupled to plates.

6. The method of fixing a unit-type linear displacement measuring apparatus according to claim 5, further comprising the step of:

fixing said object to be measured to said frame body with a second end fixture fixed to another end in the length measuring direction of said frame body and the second end fixture having a parallel plate spring mechanism which absorbs the thermal expansion of said frame body.

7. The method of fixing a unit-type linear displacement measuring apparatus according to claim 5, further comprising the step of:

fixing said object to be measured to said frame body with an intermediate-portion fixing block fixed to a substantially central portion in the length measuring direction of said frame body and having rigidity higher than that of said first end fixture.

* * * * *